| United States Patent [19] | [11] Patent Number: 5,004,551 |
|---|---|
| Sublette | [45] Date of Patent: Apr. 2, 1991 |

[54] CATALYTIC OXIDATION OF HAZARDOUS WASTES

[75] Inventor: Kerry L. Sublette, Tulsa, Okla.

[73] Assignee: ABB Environmental Services Inc., Portland, Me.

[21] Appl. No.: 542,102

[22] Filed: Jun. 22, 1990

[51] Int. Cl.$^5$ .............................................. C02F 1/72
[52] U.S. Cl. .................................... 210/763; 210/909; 405/128
[58] Field of Search ....................... 210/758, 763, 909; 405/128

[56] References Cited

U.S. PATENT DOCUMENTS 2,966,453 12/1960 Gleim et al. ........................ 208/206
3,252,892 5/1966 Gleim ................................. 208/206

*Primary Examiner*—Peter Hruskoci
*Assistant Examiner*—Krisanne Shideler
*Attorney, Agent, or Firm*—Elliot M. Olstein; Raymond J. Lillie

[57] ABSTRACT

A process for treating water or solids contaminated with at least one chlorinated phenol which comprises oxidizing the at least one chlorinated phenol in the presence of an effective catalytic amount of a corrin- or porphyrin-metal complex. A preferred catalyst is a complex of $Fe^{3+}$ ion with protoporphyrin known as hematin. Chlorinated phenols which may be oxidized include those found in hazardous wastes such as chlorophenols, dichlorophenols, trichlorophenols, tetrachlorinated phenols, and pentachlorinated phenols.

12 Claims, No Drawings

CATALYTIC OXIDATION OF HAZARDOUS WASTES

This invention relates to the oxidation of hazardous organic compounds, such as chlorinated phenols, in order to render such compounds non-hazardous and/or enhance their biodegradability. More particularly, this invention relates to the oxidation of hazardous organic compounds in the presence of a catalyst comprising a metal ion complexed with a complexing agent.

Discharged chlorinated organic compounds may be found in liquid waste or in sludge. Such compounds may cause taste and odor problems in potable water supplies. In addition, some chlorinated organic compounds may be carcinogenic or mutagenic.

U.S. Pat. No. 4,544,075, issued to Chang, et al., discloses a process for degrading chloro-organics by immersing a white-rot fungus, such as *Phanerochaete chrysosporium* in a liquid containing chloro-organics. The fungus is exposed at least periodically to an oxygen-enriched atmosphere. The efficacy and active lifetime of the fungus may be increased by adding nitrogen, a mixture of nutrient minerals, and/or a biological detergent to the liquid.

The use of a microorganism for the degradation of contaminants in soil and/or ground water, however, requires the maintenance of specific conditions which will support the viability and growth of the microorganism (e.g., amount of nutrients, temperature, pH, oxygen concentration, etc.)

In accordance with an aspect of the present invention, there is provided a process of treating water or solids contaminated with at least one chlorinated phenol. The process comprises oxidizing said at least one chlorinated phenol in the presence of an effective catalytic amount of at least one of a corrin-, or porphyrin-metal complex. In accordance with one embodiment, the metal portion of the complex is a metal ion selected from the group consisting of Group IIa, Group IIIa, Group IVa, Group Va, Group VIa, Group VIIa, Group VIII, Group Ib, Group IIIb, or the Lanthanide and Actinide series of the Periodic Table. Preferably, the metal ion is selected from the class consisting of $Fe^{+3}$, $Fe^{+2}$, $Co^{+2}$, $Ni^{+2}$, $Mo^{+3}$, $V^{+5}$, $Ca^{+2}$, $Sr^{+2}$, $Ba^{+2}$, $Cr^{+3}$, $Cr^{+5}$, $Cu^{+2}$, $Mn^{+2}$, and $Zn^{+2}$.

Porphyrins and corrins are large cyclic, metal-chelating molecules of similar structure, with porphyrins containing the ring system (1), and corrins containing the ring system (2):

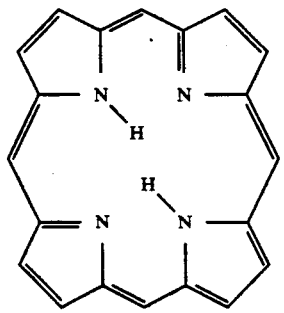
(1)

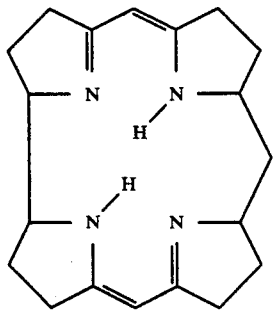
(2)

In these systems the two "central" hydrogen atoms bonded to the nitrogens may be replaced by a single coordinated metal ion to form complexes of the structures (1A) and (2A) below, where M is a metal ion:

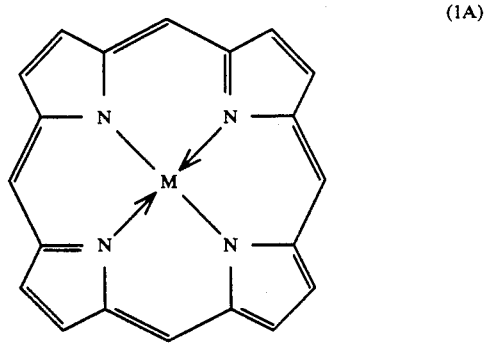
(1A)

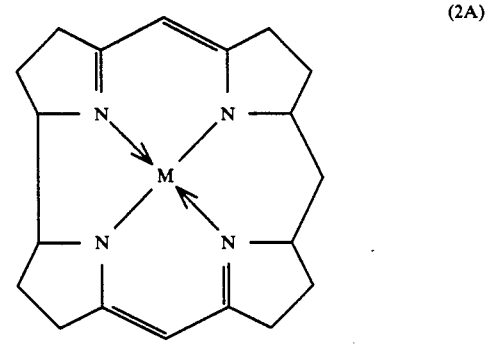
(2A)

Substituent groups may also be present on the peripheral substitution positions of these ring systems, and the metal ion M may be coordinated to additional ligands.

Porphyrins and corrins may be found in nature; for example, hemoglobin and chlorophyll, where M is iron and magnesium, respectively, are porphyrins. Corrins are, for example, found in nature as vitamins B12 (cyanocobalamin), $B12_b$ (hydroxocobalamin), and $B12_c$ (nitrosocobalamin).

Cyanocobalamin, for example, is of the following structure:

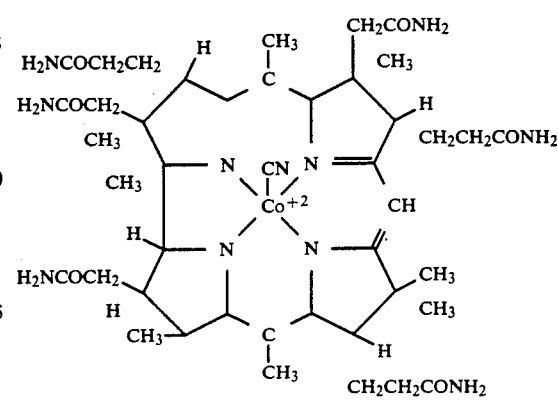

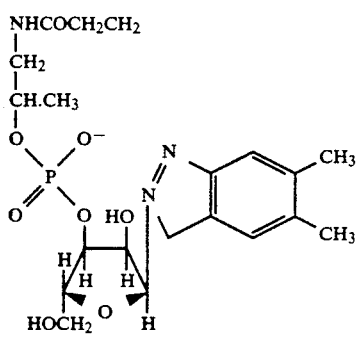

Porphyrins which may be employed include hematoporphyrin, protoporphyrin, uroporphyrin, and coproporphyrin.

Metal ions which may be complexed with the porphyrins or corrins hereinabove described include those selected from Group IIa, Group IIIa, Group IVa, Group Va, Group VIa, Group VIIa, Group VIII, Group Ib, Group IIb, Group IIIb, or the Lanthanide and Actinide series from the Periodic Table. Preferred metal ions include $Fe+3$, $Fe+2$, $Co+2$, $Ni+2$, $Mo+3$, $V+5$, $Ca+2$, $Sr+2$, $Ba+2$, $Cr+3$, $Cr+5$, $Cu+2$, $Mn+2$, and $Zn+2$. Particularly preferred metal ions are $Fe+3$ and $Fe+2$. Most preferred is $Fe+3$ ion.

In one embodiment, the metal ion may be complexed with additional ligand(s), which include cyanide, sulfite, phosphite, thiocyanate, thiosulfate, perchlorate, or polar neutral molecules such as CO and $H_2S$.

A particularly preferred catalyst is hematin which is protoporphyrin complexed with iron (III) or $Fe^{3+}$, ion.

The $Fe+3$ ion may be complexed with a ligand comprising an anion or polar neutral molecule as hereinabove described.

When a corrin is employed as the complexing agent, the corrin ring may include one or more substituents of the formula $(CH_2\ CH_2)$ n COX, wherein n is from 0 to 3, and X is —OH, or $NR_1R_2$, wherein $R_1$ and $R_2$ are independently alkyl or hydrogen, and when X is —OH, the —COOH group may be present in an ionized form with a counter cation.

It is also contemplated within the scope of the present invention that other functional group(s) may be attached to the periphery of the corrin for the purpose of changing solubility, facilitating immobilization on a solid support, or binding to soils or other natural solid substrates.

The porphyrin may include —COOH groups or other polar ionizable functional groups on the periphery of the porphyrin ring, or alternatively, one or more of the —COOH groups on the porphyrin ring may be replaced by —$COONR_1R_2$ groups wherein $R_1$ and $R_2$ are independently alkyl or hydrogen, or salts thereof with a counter cation. Other functional group(s) may also be attached to the periphery of the porphyrin ring for the purpose of chaging solubility properties or facilitating immobilization on a solid support or binding to soils or other natural solid substrates.

The porphyrin complexes may be prepared by incubating together in aqueous solution the porphyrin and the metal ion, preferably in an equimolar ratio, with an equimolar amount of the ligand if desired. For coproporphyrin, uroporphyrin, protoporphyrin and hematoporphyrin a solution of pH of 9 (tris/HCl buffer) and a chloride counter anion may be suitable. In the alkaline (pH9) conditions referred to above, the carboxylic acid groups on the porphyrin substitution positions may be ionized so that the complex may be present in solution as a carboxylate anion.

The corrin complexes may be prepared, for example, by reaction in solution together of the ligand L and a corrinoid precursor containing the following cyanometal-centered ring system:

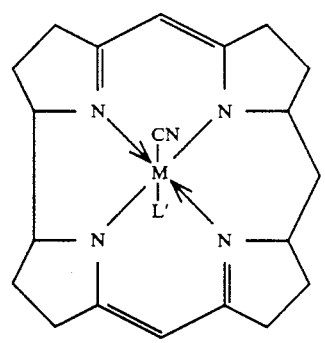

in which L' represents either an unoccupied coordination site on the metal ion, or represents a ligand which may easily be displaced by the ligand L.

Suitable conditions for preparation of the complex from a corrinoid precursor are reaction of the precursor with an equimolar amount of the ligand (and a suitable counter-ion if necessary; for example, an alkali metal) in aqueous solution.

Also, corrin- metal complexes may be prepared from naturally-occurring corrins. Corrins which are found in nature generally are complexed with $Co^{+2}$ and with a CN- ion as a ligand. The $Co^{+2}$ ion may be removed by co-incubating the corrin with a strong chelating agent in aqueous solution. The competing chelating agent should have a greater affinity for $Co^{+2}$ than the corrin and preferably will precipitate out of solution when complexed with $Co^{+2}$. An example of such a chelating agent is ethylenediamine tetraacetic acid (EDTA). A new metal ion may then be complexed by incubating the free corrin with an equimolar amount of a soluble salt of the desired metal (usually a metal chloride). The chelated metal ion may be selected from those hereinabove described. An additional ligand may be added to the complex by incubating the corrin-metal complex with an anion or polar neutral molecule such as those hereinabove described.

The porphyrin and corrin complexes may be prepared at a temperature of about 37° C. and preferably in the dark. The concentration of porphyrin, metal and ligand (if used) or of corrinoid precursor and ligand do not appear to be critical, but a convenient concentration is about 0.02M each. Under these conditions, useful amounts of the complex may be formed in about 30 minutes. The complex may be then isolated from solution using conventional methods, or may be stored in solution, preferably in the dark.

In another method of preparation, the porphyrin or corrin complex or the corrinoid precursor may be prepared by a microbiological process, i.e., by culturing a suitable microorganism which produces or secretes the complex or precursor of the complex, and then harvesting these from the culture medium using known harvesting methods.

The porphyrin and corrin complexes used in the method of the present invention may, in some cases, have one or more functional substituents such as amine, amide, hydroxy, azo, and acid groups, and may in some cases have a complex stereochemistry. Thus, the complexes may exist in a number of ionized or protonated forms depending upon the pH, etc., of the medium in which they are contained, and may also exist in a number of complexed forms or in an ionized form combined with a counter ion. The complexes may also exist in a number of complexed forms which differ only in the spatial arrangements of functional groups. The method of the present invention includes all such forms of the complex, and all stereoisometric forms thereof.

A suitable oxidizing agent will depend upon the porphyrin- or corrin-metal complex used, the concentration of the complex, and the reaction conditions (i.e., temperatures, pH, solvent, etc.). Oxidizing agents which may be employed include but are not limited to, hydrogen peroxide, $O_2$, ascorbic acid, and t-butyl hydroperoxide.

A preferred oxidizing agent is t-butylhydroperoxide, which when reduced, yields biodegradable t-butyl alcohol.

Although the scope of the present invention is not intended to be limited by any theoretical reasoning, it is believed that the oxidizing agent acts as an electron sink and the catalyst as a conveyor of electrons from the at least one chlorinated phenol to the oxidizing agent.

The method of the present invention may be used in conjunction with the oxidation of various chlorinated phenols. Oxidation products include, but are not limited to, formic acid $CO_2$ and chloride ion ($Cl-$). Chlorinated phenols which may be oxidized include, but are not limited to, chlorophenols such as 2-chlorophenol, dichlorophenols such as 2,4-dichlorophenol, and trichlorophenols such as 2,4,6-trichlorophenol, tetrachlorinated phenols, and pentachlorinated phenols. When the chlorinated phenol oxidized is 2,4,6-trichlorophenol, the oxidation products per mole of chlorinated phenol are 2 moles $CO_2$, 4 moles formic acid, and 3 moles of $Cl-$.

The invention will now be described with respect to the following example, however, the scope of the present invention is not intended to be limited thereby.

EXAMPLE

A catalyst stock solution was prepared by dissolving 1.5 mg of hematin ($Fe^{3+}$ complexed with protoporphyrin) in 15 ml of a 1:1 mixture of 0.1M Tris/HCl buffer (pH 9.0) and ethanol. Stock solutions of 2-chlorophenol, 2,4-dichlorophenol, and 2,4,6-trichlorophenol were prepared in a 1:1 mixture of Tris/HCl buffer (pH.9.0) and ethanol. To 1.0 ml of each of the chlorophenol stock solution was added from 0.2 to 0.3 ml of 70% t-butylhydroperoxide (TBHP). To each resulting mixture of chlorophenol stock solution and TBHP was added 0.5 ml of the hematin solution or 0.5 ml of Tris/ethanol buffer as a control. The resulting reaction mixtures contained the following materials in the amounts listed in Table 1 below:

TABLE 1

| Substrate | Stock Conc. (ppm) | Volume of Stock in Reaction Mixture | TBHP 70% (ml) | Hematin Solution (ml) | Tris/ethanol Buffer (ml) |
|---|---|---|---|---|---|
| 2-chlorophenol | 2500 | 1.0 | 0.3 | 0.5 | — |
| 2-chlorophenol | 2500 | 1.0 | 0.3 | — | 0.5 |
| 2,4-dichlorophenol | 3000 | 1.0 | 0.3 | 0.5 | — |
| 2,4-dichlorophenol | 3000 | 1.0 | 0.3 | — | 0.5 |
| 2,4,6-trichlorophenol | 3500 | 1.0 | 0.2 | 0.5 | — |
| 2,4,6-trichlorophenol | 3500 | 1.0 | 0.2 | — | 0.5 |

The reaction mixtures were then incubated at 20° C. for 20 minutes before being chilled in an ice bath. Cooled reaction mixtures were extracted with an equal volume of n-hexane. Extracts were then analyzed by gas chromatography (HP5890) with mass spectrometer detector. The chromatographic conditions were as follows:

| | |
|---|---|
| Column | HP-1 (crosslinked methyl silicone gum - 12 m × 0.2 mm × 0.33μ film thickness) |
| Carrier Gas | Helium |
| Temperature profile | |
| Initial temperature | 40° C. (5 min.) |
| Rate | 5° C./min. |
| Final temperature | 250° C. (12 min.) |
| Injection Port Temperature | 250° C. |
| Transfer line temperature | 200° C. |

Chlorinated phenol peaks were identified and confirmed by mass spectrum. The following retention times were observed:

2-chlorophenol: 8.1 min.
2,4-dichlorophenol: 14.0 min.
2,4,6-trichlorophenol: 18.8 min.

When the hematin - $Fe^{+3}$ complex was employed in the reaction mixture, peaks for 2-chlorophenol, 2,4-dichlorophenol, and 2,4,6-trichlorophenol did not appear on the appropriate chromatograph.

The chlorinated phenols, however, were found in the controls without hematin. Comparison to chlorinated phenol standards showed that little or no oxidation of chlorinated phenols took place in the absence of hematin.

Reaction mixtures were also analyzed by high performance liquid chromatography (HPLC) prior to hexane extraction using an HP 109L HPLC with a 10 cm×2.6 mm Hypersil 5μ column. HPLC analysis identified formic acid as an oxidation product of the chlorinated phenols. Formic acid was not found in reaction mixtures which did not contain hematin. Formic acid was identified by its retention time relative to standards and its UV spectrum.

Reactions were carried out in 100-ml septum-sealed bottles. The gas space was analyzed by gas chromatography using an HP5980 gas chromatograph with a thermal conductivity detector and a 20-ft×⅛-in. Haye Sep D column. Carbon dioxide was identified and quantitated in the gas space above reaction mixtures containing hematin. Little or no $CO_2$ was found in controls without hematin. $CO_2$ was identified and quantitated by comparison of reaction gas mixtures and gas standards purchased commercially.

Advantages of the present invention include the ability to convert hazardous chlorophenols into degradation products without the need to maintain specific temperatures, pH ranges, nutrient, concentrations, and oxygen concentrations associated with the growth and maintenance of microorganisms. The complexes employed in the present invention may be employed in a wide range of conditions, and are able to degrade chlorophenols into less hazardous compounds, which may be degraded further by microorganisms.

It is to be understood, however, that the scope of the present invention is not to be limited to the specific embodiments described above. The invention may be practiced other than as particularly described and still be within the scope of the accompanying claims.

What is claimed is:

1. A process of treating water or solids contaminated with at least one chlorinated phenol, comprising:
    oxidizing said at least one chlorinated phenol in the presence of an effective catalytic amount of at least one of a corrin- or porphyrin-metal complex.

2. The process of claim 1 wherein the metal portion of said complex is a metal selected from Group IIa, Group IIIa, Group IVa, Group Va, Group VIa, Group VIIa, Group VIII, Group Ib, Group IIb, Group IIIb, or the Lanthanide and Actinide series of the Periodic Table.

3. The process of claim 2 wherein the metal portion of said complex is a metal ion selected from the group consisting of $Fe^{+3}$, $Fe^{+2}$, $Co^{+2}$, $Ni^{+2}$, $Mo^{+3}$, $V^{+5}$, $Ca^{+2}$, $Sr^{+2}$, $Ba^{+2}$, $Cr^{+3}$, $Cr^{+5}$, $Cu^{+2}$, $Mn^{+2}$, and $Zn^{+2}$.

4. The process of claim 3 wherein said metal ion is $Fe^{+3}$.

5. The method of claim 1 wherein said complex is a porphyrin-metal complex.

6. The method of claim 5 wherein the porphyrin is protoporphyrin.

7. The method of claim 1 wherein said at least one chlorinated phenol is oxidized with t-butylhydroperoxide.

8. The method of claim 1 wherein the chlorinated phenol is 2-chlorophenol.

9. The method of claim 1 wherein the chlorinated phenol is 2,4-dichlorophenol.

10. The method of claim 1 wherein the chlorinated phenol is 2,4,6-trichlorophenol.

11. The method of claim 1 wherein the chlorinated phenol is a tetrachlorinated phenol.

12. The method of claim 1 wherein the chlorinated phenol is a pentachlorinated phenol.

* * * * *